(12) United States Patent
Sridhar et al.

(10) Patent No.: US 7,785,744 B2
(45) Date of Patent: Aug. 31, 2010

(54) FUEL CELL WATER PURIFICATION SYSTEM AND METHOD

(75) Inventors: K.R. Sridhar, Los Gatos, CA (US); Swaminathan Venkataraman, Cupertino, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 1311 days.

(21) Appl. No.: 11/236,737

(22) Filed: Sep. 28, 2005

(65) Prior Publication Data

US 2007/0072027 A1 Mar. 29, 2007

(51) Int. Cl.
*H01M 8/04* (2006.01)
*B01D 35/18* (2006.01)

(52) U.S. Cl. ..................... 429/428; 210/175
(58) Field of Classification Search .............. None
See application file for complete search history.

(56) References Cited

U.S. PATENT DOCUMENTS

| | | | |
|---|---|---|---|
| 4,132,588 A | 1/1979 | Ogawa | |
| 4,312,710 A | 1/1982 | Tanaka et al. | |
| 4,591,413 A | 5/1986 | Peterson | |
| 4,756,797 A | 7/1988 | Elmore et al. | |
| 6,365,290 B1 | 4/2002 | Ghezel-Ayagh et al. | |
| 2003/0132097 A1 | 7/2003 | Kenet et al. | |
| 2004/0185321 A1 | 9/2004 | Sutherland et al. | |
| 2004/0219400 A1 | 11/2004 | Al-Hallaj et al. | |
| 2005/0164051 A1 | 7/2005 | Venkataraman et al. | |

FOREIGN PATENT DOCUMENTS

WO       WO 96/05625 A2       2/1996

OTHER PUBLICATIONS

Al-Hallaj, Dr. Said, Apr. 2004, "Integration of Fuel Cell and Desalination Systems for Power and Fresh Water Production", www.mutah.edu.jo/engconf/saidtalk.html., 2 pages.

*Primary Examiner*—Patrick Ryan
*Assistant Examiner*—Cynthia Lee
(74) *Attorney, Agent, or Firm*—The Marbury Law Group PLLC

(57) ABSTRACT

A water purification system includes a fuel cell stack, a steam generator, and a water purification unit. The fuel cell stack is adapted to provide heat to the steam generator and the steam generator is adapted to provide steam to the water purification unit.

13 Claims, 4 Drawing Sheets

FUEL CELL WATER PURIFICATION SYSTEM AND METHOD

BACKGROUND OF THE INVENTION

The present invention is generally directed to fuel cells incorporated into desalination systems.

The world's population is increasing due to extensive urbanization across the globe. In many locations there are often not enough natural resources to keep up with the growing demand. One natural resource that is lacking is potable water. The lack of potable water is also a problem on sailing vessels. In areas where potable water is scarce, there are often sources of salinated water, such as the ocean or seas. However this water needs to be desalinated. In order to desalinate the water, even more resources are required, namely energy needed to power the desalination systems and to generate steam used in the desalination process.

Conventional power plants have been employed to power desalination equipment. However, the power plants cannot power desalination equipment located in remote locations that are not connected to the power grid. Furthermore, even where the desalination equipment is connected to the power grid, a power interruption would also interrupt the supply of clean drinking water.

BRIEF SUMMARY OF THE INVENTION

An embodiment of the present invention provides a water purification system comprises a fuel cell stack, a steam generator, and a water purification unit. The fuel cell stack is adapted to provide heat to the steam generator and the steam generator is adapted to provide steam to the water purification unit.

DETAILED DESCRIPTION OF THE PREFERRED EMBODIMENTS

A fuel cell system is integrated with a water purification unit, such as a desalination unit, and optionally with a steam generator to provide the power and/or a heating medium, such as a steam, to the desalination unit in order to operate the desalination unit. Thus, a separate power source which provides electrical power to a steam generator is not required and the water purification unit can be powered by a source that is not necessarily connected to the power grid.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

Figure 1A:
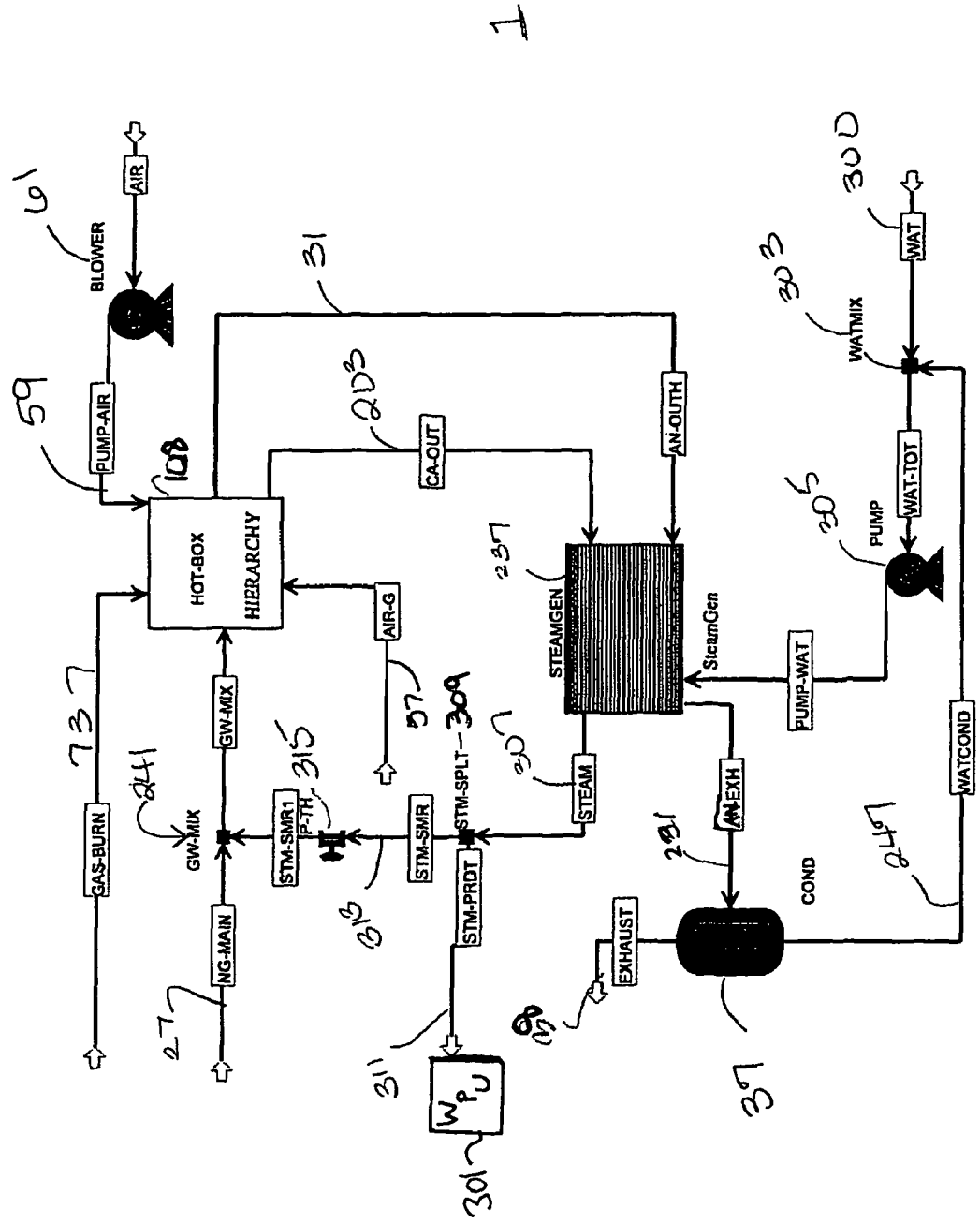
FIG. 1A is a schematic of a fuel cell system with steam generation according to embodiments of the invention.

FIG. 1A illustrates a fuel cell system 1. The system contains a hot box 108 in which a fuel cell stack and auxiliary components are located. The contents of the hot box 108 are illustrated in detail in FIG. 1B and are described in more detail below. The fuel cell system 1 preferably comprises a high temperature fuel cell system, such as a solid oxide fuel cell (SOFC) system or a molten carbonate fuel cell system. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode. For example, the fuel cell system described in U.S. patent application Ser. No. 11/002,681, filed on Dec. 3, 2004, which is hereby incorporated by reference in its entirety, may be used.

The system also contains a fuel inlet conduit 27 which provides fuel to the fuel cell stack and an air inlet conduit 59 which provides air from a blower 61 to the stack. Optionally, the system 1 also contains an optional burner or a combustor, as will be described in more detail with respect to in FIG. 1B. In this case, the system 1 also contains a burner fuel delivery conduit 73 and a burner air delivery conduit 57 which provide fuel and air, respectively, into the burner.

The system 1 preferably also contains a steam generator 237 which generates steam for the water purification unit, such as a desalination unit 301, using the heat from the fuel cell stack and/or other hot box components, such as the burner. Preferably, at least one exhaust stream conduit 31, 203 from the fuel cell stack is provided to the steam generator 237 in order use heat from at least one fuel cell stack exhaust stream to convert inlet water provided to the steam generator into steam. Preferably both the air (i.e., cathode) and fuel (i.e., anode) exhaust stream conduits 31, 203 are provided into the steam generator 237 to convert the inlet water into steam.

The inlet water is provided into the steam generator 237 from a water inlet conduit 300 using a water pump 305. Other water providing equipment may also be used. The water may be any suitable water which can generate steam, such as salt or fresh water, including polluted or purified water.

The steam generator 237 may comprise any suitable heat exchanger which heats water to form steam. For example, the steam generator 237 may comprise a counter flow or a co-flow heat exchanger in which the water flows through pipes and the hot air and/or fuel exhaust gas from conduits 31, 203 flows around the outside of the pipes to raise the temperature of the water inside the pipes above the boiling point. If both air and fuel exhaust gases are provided into the steam generator 237, then each gas may be provided into a different part of the steam generator to heat the water sequentially and to avoid mixing of the air and fuel exhaust gases. Optionally, an additional heater may be placed in steam generator 237 in order to superheat the steam to increase the output of steam.

The steam from the steam generator 237 is provided to a gas flow splitter, such as a manually or computer controlled valve 309, through conduit 307. The steam is provided by the splitter 309 to the desalination unit 301 via conduit 311 and/or into the fuel inlet stream in conduit 27 to humidify the fuel inlet stream. The steam is provided from the splitter 309 to the fuel inlet conduit 27 through conduit 313. The amount of steam to be provided to the fuel inlet conduit 27 may be controlled by a second valve 315 located in conduit 313. The steam and the natural gas fuel in conduit 27 are mixed by any suitable gas mixer 241.

If desired, the water vapor containing fuel exhaust stream from the fuel cell stack, such as the anode exhaust from a SOFC stack, may be provided from the steam generator 237 into a condenser 37 through conduit 231. In the condenser 37, the water vapor contained in the fuel exhaust stream is condensed into water while the remaining fuel exhaust gases (i.e., carbon monoxide, carbon dioxide and hydrogen) are removed via conduit 38. The condensed water is then recycled through conduit 247 and water mixer 303 into the water inlet conduit 300.

As noted above, the steam from the steam generator 237 is then provided into the water purification unit 301 through conduit 311. The steam is used to heat salinated or polluted water in the unit 301 to purify such water, as will be discussed in more detail below. Thus, the cathode and anode exhausts from the fuel cell stack are combusted to produce heat that evaporates water and produces high pressure steam (>150 psig). Part of the steam is recycled back into the hot box 108 for steam methane reformation. For example, it is estimated that roughly 25 kg/hr of steam may be produced for 1 kW of heating value of natural gas at 75% fuel utilization. The system can be bootstrapped to produce more steam either by reducing the fuel utilization or by introducing natural gas directly into the steam generator 237.

In an alternative embodiment, the fuel and/or the air exhaust from the fuel cell stack may also be provided into the water purification unit 301. The hot fuel exhaust and/or the hot air exhaust may be used in the unit 301 to heat the salinated or polluted water to purify the water. The hot fuel and/or the air exhaust may be provided into the unit 301 after passing through the steam generator 327 or without first passing through the steam generator 327. Thus, the fuel cell stack may be used to provide heat to the unit 301 by generating steam in the steam generator 327 and/or by providing hot exhaust gas to the unit 301.

Figure 1B:
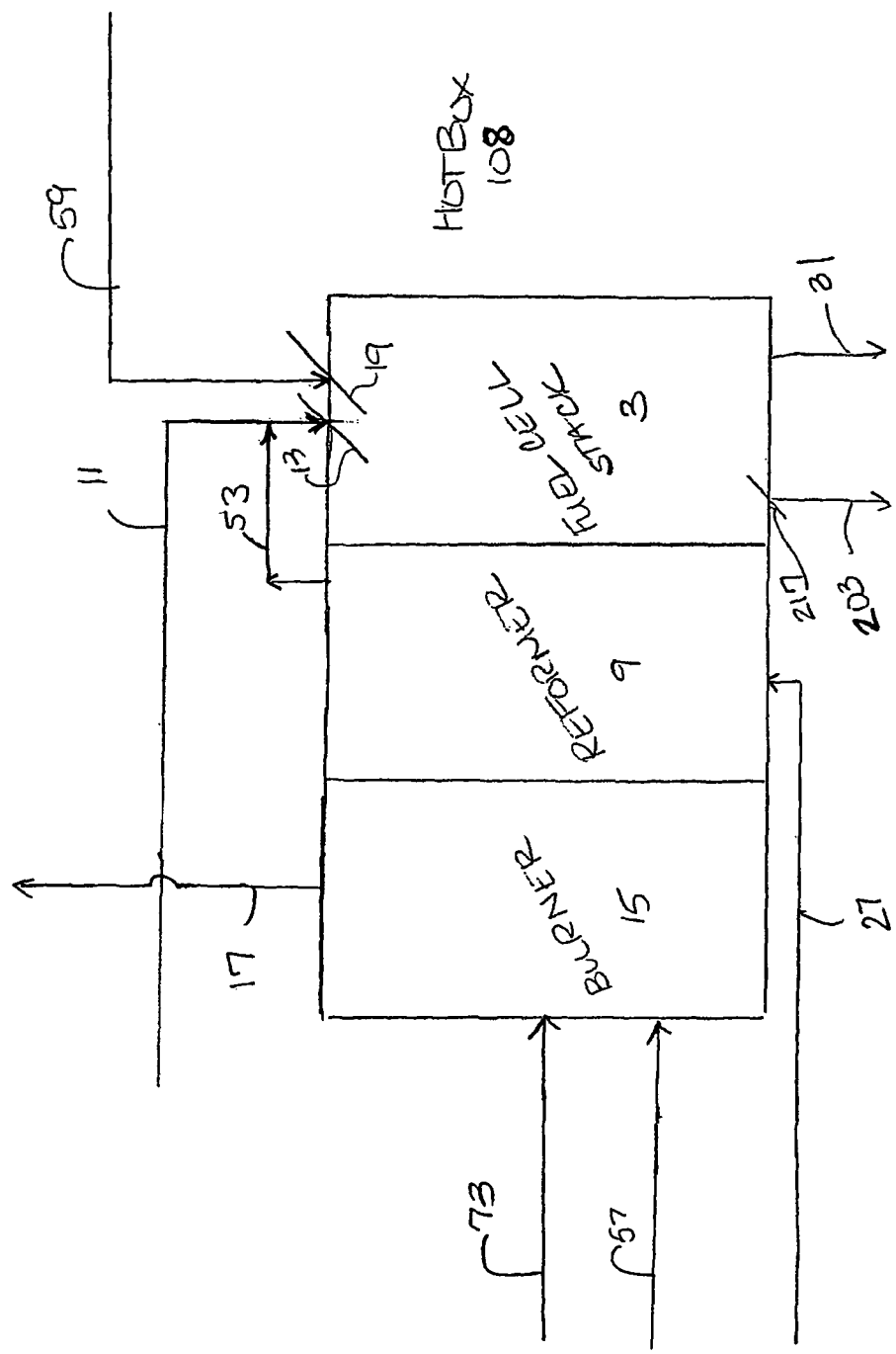
FIG. 1B is a schematic of a hot box portion of the system of FIG. 1A.

FIG. 1B illustrates details of a portion of the fuel cell system 1 which is located in the hot box 108 shown in FIG. 1A. The fuel cell system contains one or more fuel cell stacks 3, each of which contains a plurality of high temperature fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, fuel cell housing and insulation. In a SOFC operating in the fuel cell mode, the oxidizer, such as air or oxygen gas, enters the cathode chamber, while the fuel, such as hydrogen or hydrocarbon fuel, enters the anode chamber. Any suitable fuel cell designs and component materials may be used.

The system 1 also preferably contains a hydrocarbon fuel reformer 9 which is located separately from but thermally integrated with the high temperature fuel cell stack 3 to support the endothermic reaction in the reformer 9 and to cool the stack 3. The system also preferably contains a burner or combustor 15. Thus, the system comprises a thermally integrated reformer 9, combustor 15 and stack 3. The reformer 9 may be heated by the stack cathode exhaust, by radiative and convective heat from the stack and/or by the combustor heat during steady state operation.

The term "thermally integrated" in this context means that the heat from the reaction in the fuel cell stack 3 drives the net endothermic fuel reformation in the fuel reformer 9. As illustrated in FIG. 1B, the fuel reformer 9 may be thermally integrated with the fuel cell stack 3 by placing the reformer 9 and stack 3 in the same hot box 108 and/or in thermal contact with each other, or by providing a thermal conduit or thermally conductive material which connects the stack 3 to the reformer 9.

The stack 3 generates enough heat to conduct the SMR reaction in the reformer 9 during steady-state operation of the system 1. However, under some different operating conditions ranging from low to high stack efficiency and fuel utilization, the exothermic heat generated by the stack 3 and provided to the reformer 9 may be in greater than, the same as or less than the heat required to support the steam methane reforming reaction in the reformer 9. The heat generated and/or provided by the stack 3 may be less than required to support steam reformation in the reformer 9 due to low fuel utilization, high stack efficiency, heat loss and/or stack failure/turndown. In this case, supplemental heat is supplied to the reformer 9. The system 1 provides the supplemental heat to the reformer 9 to carry out the SMR reaction during steady state operation. The supplemental heat may be provided from the burner or combustor 15 which is thermally integrated with the reformer 9 and/or from a cathode (i.e., air) exhaust conduit which is thermally integrated with the reformer 9. While less preferred, the supplemental heat may also be provided from the anode (i.e., fuel) exhaust conduit which is thermally integrated with the reformer. The supplemental heat may be provided from both the combustor 15 which is operating during steady state operation of the reformer (and not just during start-up) and from the cathode (i.e., air) exhaust of the stack 3. For example, the combustor 15 may be in direct contact with the reformer, and the stack cathode exhaust conduit 203 is configured such that the cathode exhaust contacts the reformer 9 and/or wraps around the reformer 9 to facilitate additional heat transfer. This lowers the combustion heat requirement for SMR.

Preferably, the reformer 9 is sandwiched between the combustor 15 and one or more stacks 3 to assist heat transfer as described in more detail below. For example, the reformer 9 and combustor 15 share at least one wall. The combustor 15, when attached to the reformer 9, closes the heat balance and provides additional heat required by the reformer. When no heat is required by the reformer, the combustor unit acts as a heat exchanger. Thus, the same combustor (i.e., burner) 15 may be used in both start-up and steady-state operation of the system 1. When using combustion catalysts coated on the conduit walls, natural gas is preferably introduced at several places in the combustion zone to avoid auto ignition and local heating.

In operation, a natural gas (and/or other hydrocarbon fuel) and steam mixture is fed to the lower end of the reformer 9 through the fuel inlet conduit 27. If desired, the fuel may be provided directly into the stack via a by-pass conduit 11 which by-passes the reformer 9. The reformed product is provided from the reformer 9 into the stack anode (fuel) inlet 13 through conduit 53. The spent fuel is exhausted from the stack through the anode exhaust conduit 31.

The air enters the stack through the cathode (air) inlet 19 and exits through exhaust opening 217 into the cathode (i.e., air) exhaust conduit 203. The system 1 is preferably configured such that the cathode exhaust (i.e., hot air) exists on the same side of the system as the inlet of the reformer 9. For example, as shown in FIG. 1B, since the mass flow of hot cathode exhaust is the maximum at the lower end of the device, it supplies the maximum heat where it is needed, at feed point of the reformer 9. In other words, the mass flow of the hot air exiting the stack is maximum adjacent to the lower portion of the reformer 9 where the most heat is needed. However, the cathode exhaust and reformer inlet may be provided in other locations in the system 1, such as to the steam generator 237. If desired, the hot combustor 15 exhaust may be provided into the steam generator 237 through conduit 17 to heat the water in the generator 237 to generate steam. The combustor exhaust may be provided into the steam generator in addition to or instead of one or more exhaust streams from the fuel cell stack 3.

Figure 2:
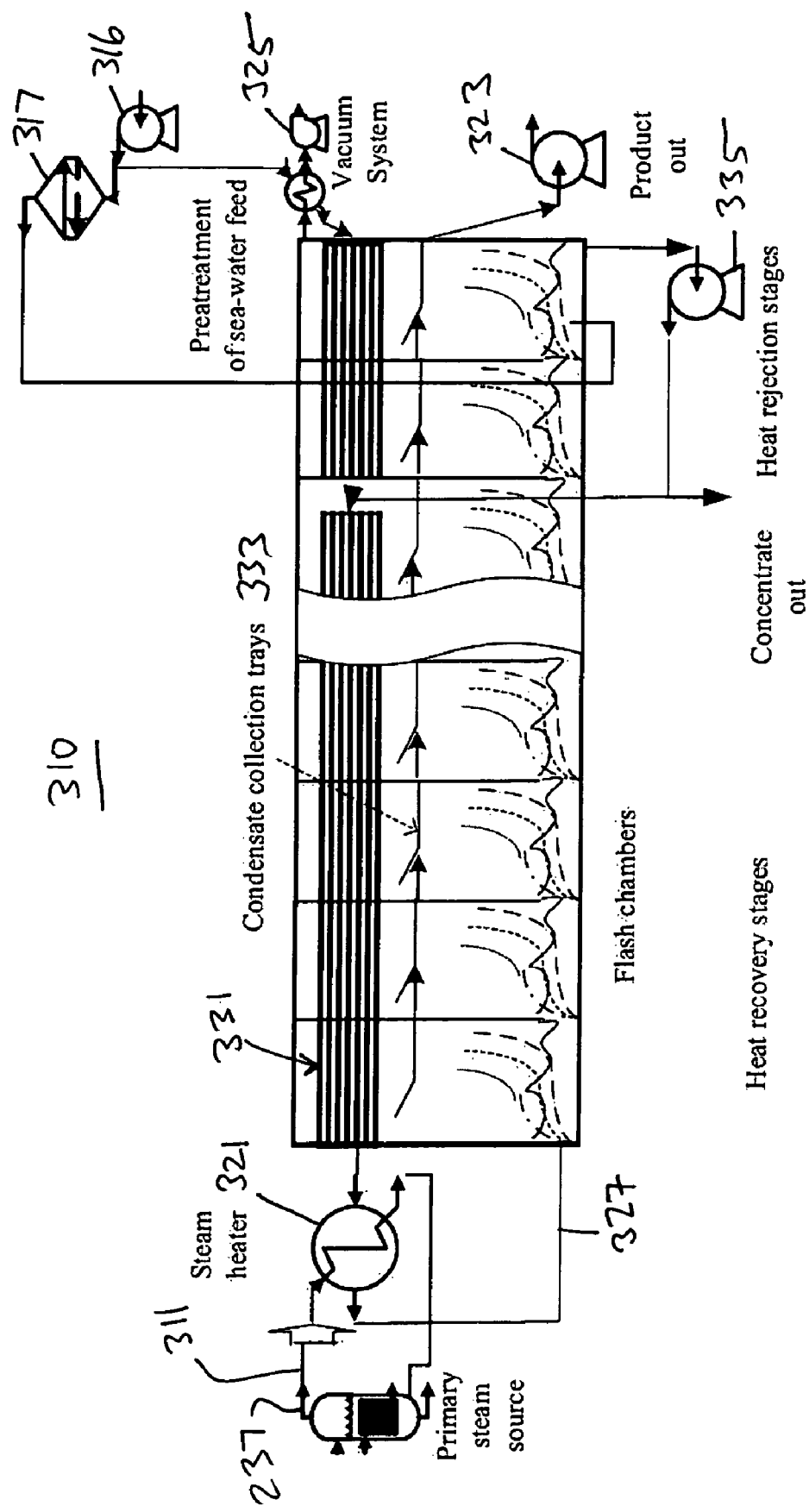
FIG. 2 is a schematic of a desalination system according to a embodiment of the invention that employs a multi-stage flash (MSF) desalination unit.
Figure 3:
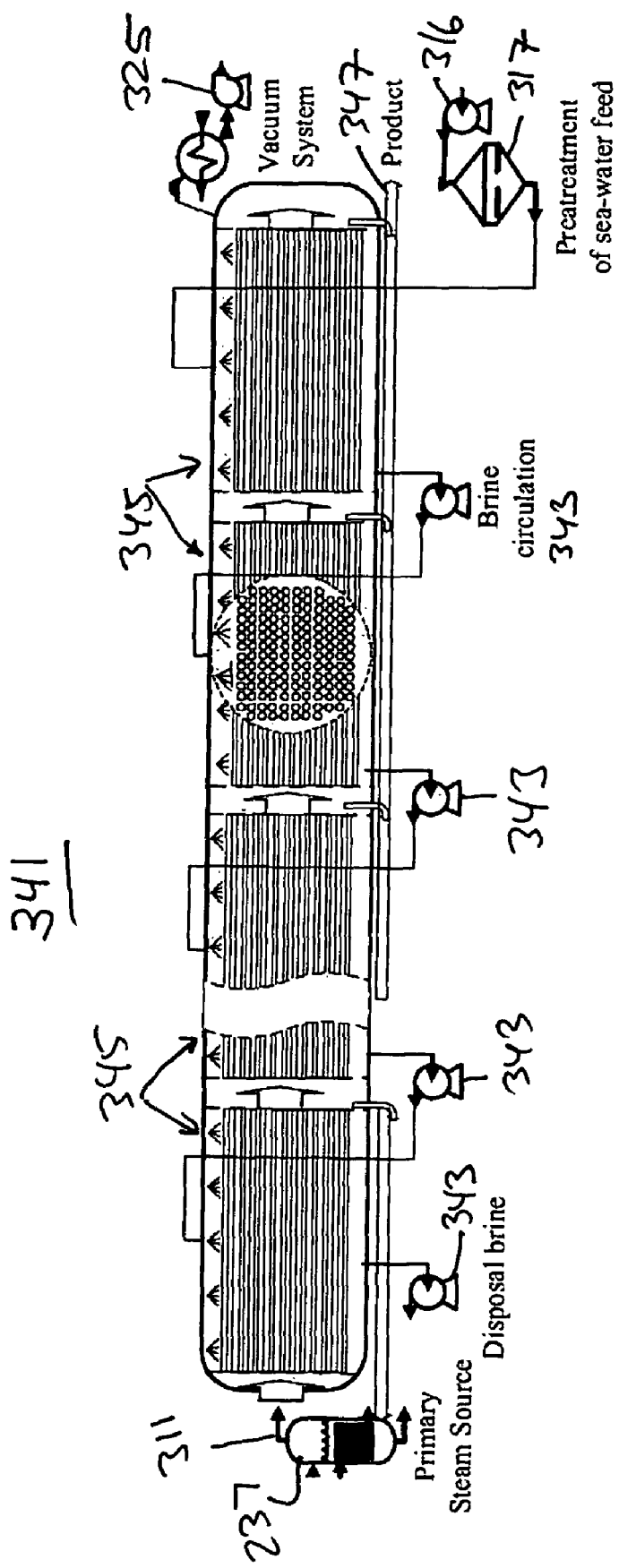
FIG. 3 is a schematic of a desalination system according to another embodiment of the invention that employs a multi-effect distillation (MED) desalination unit.

FIGS. 2 and 3 illustrate exemplary water purification units. While the illustrated units comprise desalination units, other purification devices which purify polluted water are also contemplated. Desalination is a process that removes dissolved minerals (including but not limited to salt) from seawater, brackish water, or treated wastewater. Preferably, the desalination processes removes enough dissolved minerals for the water to be potable.

One common method of desalinating water involves distillation. In the distillation process, feed water is heated and then evaporated to separate out dissolved minerals or "brine." The most common methods of distillation include but are not limited to multistage flash (MSF), multiple effect distillation (MED), and vapor compression (VC), and hybrids thereof. Thus, MSF, MED or VC water purification (i.e., desalination) units 301 may be used together with the fuel cell system.

FIG. 2 illustrates an exemplary MSF desalination unit 310. The MSF distillation process involves heating of seawater in a container known as a brine heater. This is usually achieved by condensing steam on a bank of tubes carrying seawater through the brine heater. The steam to the brine heater is provided from the steam generator 237 and/or from a fuel cell stack exhaust, as described above. The heated seawater is passed to another container known as a "stage", where the surrounding pressure is lower than that in the brine heater. The sudden introduction of this water into a lower pressure "stage" causes the water to boil so rapidly as to flash into steam. Only a percentage of this water is converted into steam. The remaining water is sent through a series of additional stages, each possessing a lower ambient pressure than the previous "stage". As vapor steam is generated, it is condensed on tubes of heat exchangers that run through each stage and is then collected as desalinated water.

The MSF desalination unit 310 is comprised of a plurality of stage flash chambers 320. Each of the flash chambers are at a consecutively lower pressure, meaning that the stage at which the feed water enters has the highest pressure of all of the flash chambers. The pressure is regulated by the vacuum system 325.

The steam generated by the steam generator 237 is provided to the brine or steam heater 321 via line 311. The seawater or other salt water is provided into the unit 310 using a pump 316. This water may pass through a pre-treatment device, such as a filter 317, if desired. The seawater may then be provided through cooling water tubes 331 into the heater 321 to preheat the seawater. The seawater is heated in the heater 321 and is then provided into the flash chambers 320 via conduit 327. Alternatively, the seawater may be provided directly into the heater 321 and a different water is passed through the cooling tubes 331.

In the flash chambers 320, the seawater is evaporated and the vapor then rises to the upper, condenser portions of the flash chambers 320 containing the cooling water tubes 331. The vapor is condensed on the cooling water tubes 331 and is collected in the condensate collection trays 333 located below the tubes 331. The collected condensate (i.e., desalinated water) is then removed from the trays 333 by pump 323. Another pump 335 is used to remove the concentrate from the unit 310. The power for the pumps and the vacuum system may be provided from the fuel cell stack 3 if the pumps and vacuum system are electrically connected to the stack 3.

FIG. 3 illustrates a water purification unit 301 which comprises a multi-effect distillation (MED) unit 341 according to another embodiment of the invention. The MED or multiple-effect evaporator unit 341 is an apparatus for efficiently using the heat of steam to evaporate water. In a MED unit, water is boiled in a sequence of vessels, each held at a lower pressure than the last. Because the boiling point of water decreases as pressure decreases, the vapor boiled off in one vessel can be used to heat the next, and only the first vessel (at the highest pressure) requires an external source of heat. Such evaporators usually have four stages or less. Thus, in this embodiment the feed water passes through a number of evaporator stages in series.

The pressure in unit 341 is regulated by the vacuum system 325. The steam generated by the steam generator 237 is provided to the unit 341 via line 311. The seawater or other salt water is provided into the unit 341 using a pump 316. This water may pass through a pre-treatment device, such as a filter 317, if desired. A plurality of brine circulator pumps 343 circulate the brine between the evaporator stages or chambers (also referred to as "effects") 345. The condensate is removed from the unit 341 through conduit 347. The power for the pumps and the vacuum system may be provided from the fuel cell stack 3.

While not specifically illustrated, the water purification unit 301 may also comprise a vapor compression unit which is used to desalinate water. This process also involves evaporating the feed water, compressing the vapor and then using the heated compressed vapor as a heat source to evaporate additional feed water. The steam generator can provide the steam to evaporate the feed water and the fuel cell stack can optionally be adapted to provide power for this unit.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A water purification system comprising:
    a fuel cell stack;
    a steam generator;
    a water purification unit;
    an air exhaust stream conduit; and
    a fuel exhaust stream conduit;
wherein:
    the air exhaust stream conduit and the fuel exhaust stream conduit are adapted to provide an air exhaust stream and a fuel exhaust stream, respectively, from the fuel cell stack to the steam generator to provide heat to convert inlet water of the steam generator into steam; and
    the steam generator is adapted to provide the steam to the water purification unit.

2. The system of claim 1, wherein the water purification unit comprises a water desalination unit.

3. The system of claim 1, wherein the fuel cell stack is comprised of high temperature fuel cells.

4. The system of claim 3, wherein the fuel cells are solid oxide fuel cells.

5. The system of claim 2, wherein the fuel cell stack is electrically connected to water pumps of the water desalination unit.

6. The system of claim 2, wherein the water desalination unit comprises a vapor compression (VC), a multistage flash (MSF) or a multi effect distillation (MED) desalination unit.

7. A method of desalinating water comprising:
   generating electricity and air and fuel exhaust streams from a fuel cell stack;
   providing the air exhaust stream which consists essentially of air into a steam generator to convert water in the steam generator into steam; and
   heating salinated water with the steam from the steam generator during a desalination process to desalinate the salinated water.

8. The method of claim 7, further comprising providing electricity from the fuel cell stack to power a water desalination unit in which the salinated water is being desalinated.

9. The method of claim 7, wherein:
   the fuel cell stack comprises a solid oxide fuel cell stack; and
   the desalination unit comprises a vapor compression (VC), a multistage flash (MSF) or a multi effect distillation (MED) desalination unit.

10. The system of claim 1, wherein the air exhaust stream conduit and the fuel exhaust stream conduit are arranged such that the air exhaust stream and the fuel exhaust stream are kept separate to sequentially heat the inlet water of the steam generator.

11. The system of claim 1, further comprising a splitter to split the steam generated by the steam generator to provide the steam to the water purification unit and to humidify a fuel inlet stream of the fuel cell stack.

12. The method of claim 7, further comprising providing the fuel exhaust stream into the steam generator to heat the water, wherein the air exhaust stream and the fuel exhaust stream are kept separate to sequentially heat the water in the steam generator.

13. The method of claim 7, further comprising splitting the steam from the steam generator to provide the steam to heat salinated water and to humidify a fuel inlet stream of the fuel cell stack.

\* \* \* \* \*